United States Patent [19]
Hayashi

[11] Patent Number: 5,531,466
[45] Date of Patent: Jul. 2, 1996

[54] VEHICLE HAVING A FOUR-WHEEL STEERING DEVICE

[75] Inventor: Tetsuaki Hayashi, Sakai, Japan

[73] Assignee: Kubota Corporation, Osaka, Japan

[21] Appl. No.: 311,602

[22] Filed: Sep. 23, 1994

[30] Foreign Application Priority Data

Mar. 24, 1994 [JP] Japan ................................. 6-053393

[51] Int. Cl.⁶ .................................................. B62D 1/00
[52] U.S. Cl. ............................ 280/91.1; 280/99; 180/409
[58] Field of Search ............................... 280/91, 99, 98, 280/100; 180/79.3, 900, 908

[56] References Cited

U.S. PATENT DOCUMENTS

| | | | |
|---|---|---|---|
| 3,198,541 | 8/1965 | Christenson et al. | 280/91 |
| 3,596,730 | 8/1971 | Cecce | 280/91 X |
| 4,738,459 | 4/1988 | Nakamura et al. | 280/91 |
| 4,798,393 | 1/1989 | Miura et al. | 180/900 X |
| 4,977,733 | 12/1990 | Samejima et al. | 280/91 X |
| 5,288,091 | 2/1994 | Deschamps | 280/91 |

FOREIGN PATENT DOCUMENTS 0232080  9/1988  Japan ........................ 280/91

*Primary Examiner*—Christopher P. Ellis
*Attorney, Agent, or Firm*—Webb Ziesenheim Bruening Logsdon Orkin & Hanson

[57] ABSTRACT

A four-wheel steering vehicle having a body frame, front and rear wheels steerable by a steering wheel, and a connecting mechanism for transmitting movement of the steering wheel to the front and wheels. The connecting mechanism includes a pitman arm overhanging laterally of the body frame to be pivotable with turning of the steering wheel, a first front wheel knuckle arm operatively connected to one of the front wheels, a first rear wheel knuckle arm operatively connected to one of the rear wheels disposed at the same side as the other front wheel, a front wheel drag link disposed laterally outwardly of the body frame and extending longitudinally of the body frame, the front wheel drag link interconnecting the pitman arm and the first front wheel knuckle arm, and a rear wheel drag link extending substantially horizontally over and across the body frame, the rear wheel drag link interconnecting the pitman arm and the first rear wheel knuckle arm. The one rear wheel and the first rear wheel knuckle arm are operatively interconnected through a rear wheel kingpin assembly. The rear wheel kingpin assembly includes an inner support fixed to a rear axle case, an outer support, and a kingpin rotatable about a vertical axis and interconnecting the inner support and the outer support. The first rear wheel knuckle arm is fixed to an upper end region of the outer support.

6 Claims, 4 Drawing Sheets

VEHICLE HAVING A FOUR-WHEEL STEERING DEVICE

BACKGROUND OF THE INVENTION

1. Field of the Invention

The present invention relates to a vehicle, particularly a lawn mower or a tractor, having a four-wheel steering device.

2. Description of the Related Art

A conventional riding lawn mower having a four-wheel steering device employs a mechanism for steering front and rear wheels in opposite directions at the same time in order to obtain a small turning radius. To realize this mechanism, the riding lawn mower disclosed in U.S. Pat. No. 4,977,733, for example, includes a pitman arm disposed at the left side of a body frame and projecting outwardly from the body frame through an opening formed therein. A front wheel drag link is connected to a front wheel knuckle arm also disposed at the left side of the body frame. A rear wheel drag link is connected to a rear wheel knuckle arm disposed at the opposite side of the pitman arm, i.e. the right side of the body frame. With this construction, the front and rear wheels are steerable in opposite directions.

A region under the body frame is used as a space for accommodating a grass cutting unit. It is therefore difficult to connect the pitman arm and rear wheel drag link in a position below the body frame, with the rear wheel drag link extending transversely under the body frame. Moreover, in order to avoid interference with a rear axle case, the rear wheel drag link is connected to the knuckle arm which is disposed in a lower position of a rear wheel kingpin assembly. If a large level difference is provided between a point of connection of the rear wheel drag link to the pitman arm and a point of connection thereof to the knuckle arm, the drag link will be subjected to a great bending force due to a reaction from the rear wheels in time of steering, i.e. a reaction from the rear wheels occurring when the pitman arm turns to push the rear wheel knuckle arm through the drag link. In order to minimize the level difference between the point of connection of the rear wheel drag link to the pitman arm and the point of connection thereof to the knuckle arm, the conventional riding lawn mower noted above has the body frame defining the opening for allowing the pitman arm to project therethrough, and the pitman arm and rear wheel drag link are connected to each other adjacent the opening. However, this opening has a drawback of reducing strength of the body frame.

Despite such contrivance, the rear wheel drag link must be bent vertically, and this complicated shape inevitably involves a cost increase. Further, the bending force acting on the drag link as noted above is not very small but requires the drag link to be thick. This results in a drawback of requiring an increased steering effort, for example.

SUMMARY OF THE INVENTION

An object of the present invention is to provide a connecting mechanism for transmitting movement of a pitman arm to rear wheels as well as front wheels while avoiding interference with a body frame.

Another object of the invention is to prevent a strong bending force from acting on a rear wheel drag link.

The above object is fulfilled, according to the present invention, by a connecting mechanism comprising:

a pitman arm overhanging laterally of a body frame to be pivotable with turning of a steering wheel;

a first front wheel knuckle arm operatively connected to one of front wheels;

a first rear wheel knuckle arm operatively connected to one of rear wheels disposed at the same side as the other front wheel;

a front wheel drag link disposed laterally outwardly of the body frame and extending longitudinally of the body frame, the front wheel drag link interconnecting the pitman arm and the first front wheel knuckle arm; and a rear wheel drag link extending substantially horizontally over and across the body frame, the rear wheel drag link interconnecting the pitman arm and the first rear wheel knuckle arm.

According to this connecting mechanism, the pitman arm overhangs laterally of the body frame, and is connected to the first rear wheel knuckle arm through the rear wheel drag link extending over and across the body frame. This construction allows the front wheel knuckle arm and rear wheel knuckle arm to be connected to the pitman arm without requiring an opening formed in the body frame for allowing the pitman arm to project outward.

In a preferred embodiment of the invention, the one rear wheel and the first rear wheel knuckle arm are operatively interconnected through a rear wheel kingpin assembly. The rear wheel kingpin assembly includes an inner support fixed to a rear axle case, an outer support, and a kingpin rotatable about a vertical axis and interconnecting the inner support and the outer support. The first rear wheel knuckle arm is fixed to an upper end region of the outer support.

The first rear wheel knuckle arm fixed to the upper end region of the outer support produces the effect of reducing a level difference between a point of connection of the rear wheel drag link to the pitman arm and a point of connection thereof to the knuckle arm. This results in a reduced bending force due to a reaction in time of a steering operation.

The rear wheel drag link may have a simple, straight shape, and may have a small diameter since this drag link is free from a strong bending force. Consequently, the drag link may be formed lightweight, providing advantages of cost reduction and light steering operation.

Other features and advantages of the present invention will be apparent from the following description of an embodiment taken in conjunction with the drawings.

DESCRIPTION OF THE PREFERRED EMBODIMENT

Figure 1:
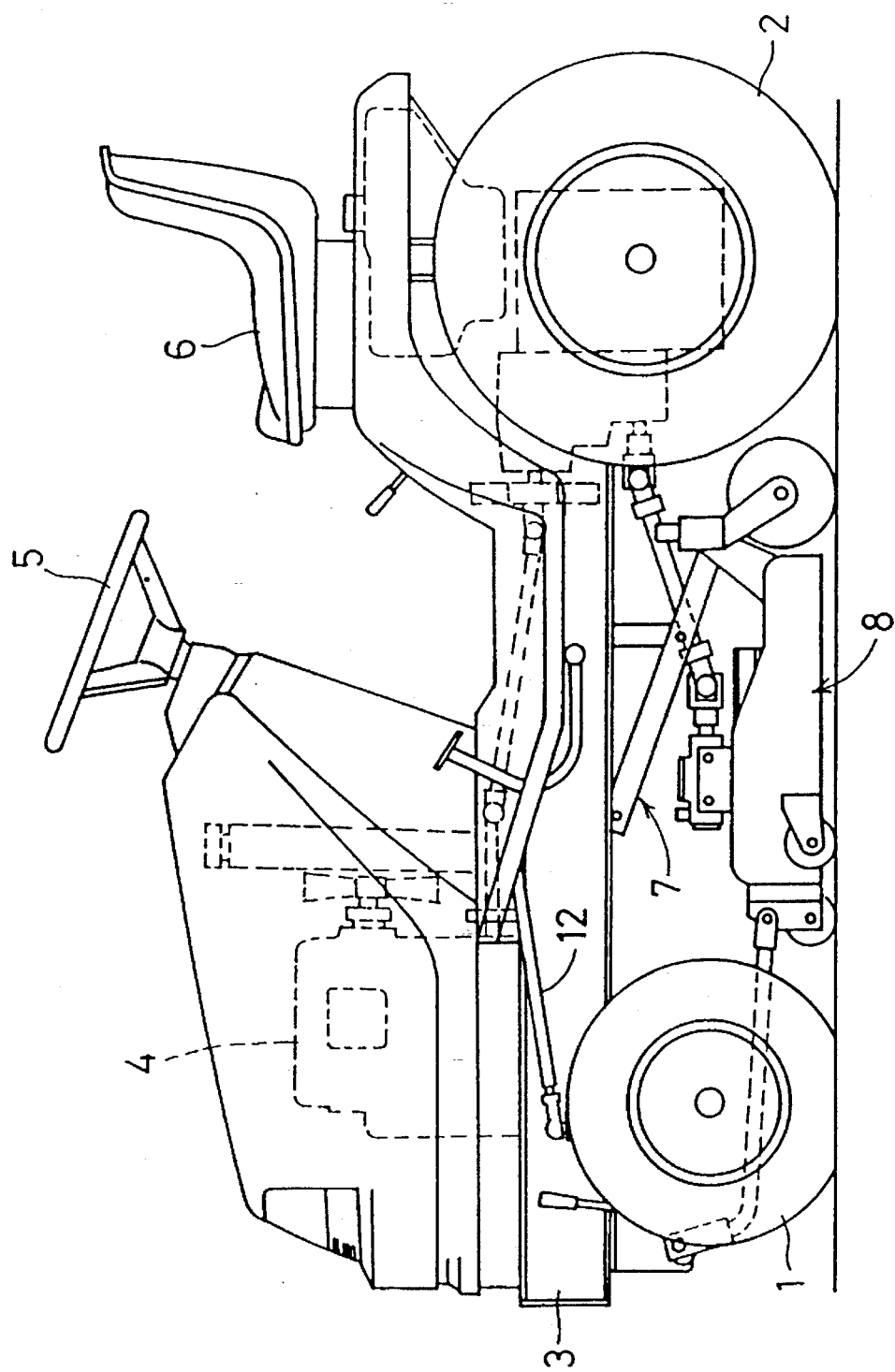
FIG. 1 is a side elevation of a lawn mower having a four-wheel steering device according to the present invention.

FIG. 1 shows a mid-mount type riding lawn mower. This lawn mower has front wheels 1 and rear wheels 2 supporting a body frame 3. The body frame 3 supports an engine 4 mounted on a front portion thereof, a steering wheel 5 disposed centrally thereof, and a driver's seat 6 disposed in a rear region. The body frame 3 further supports a grass cutting unit 8 suspended through a link mechanism 7 between front and rear wheels 1 and 2.

This lawn mower is driven by the rear wheels 2, and includes a four-wheel steering device for steering the front and rear wheels 1 and 2 in opposite directions at the same time in response to a turning operation of the steering wheel 5.

Figure 2:
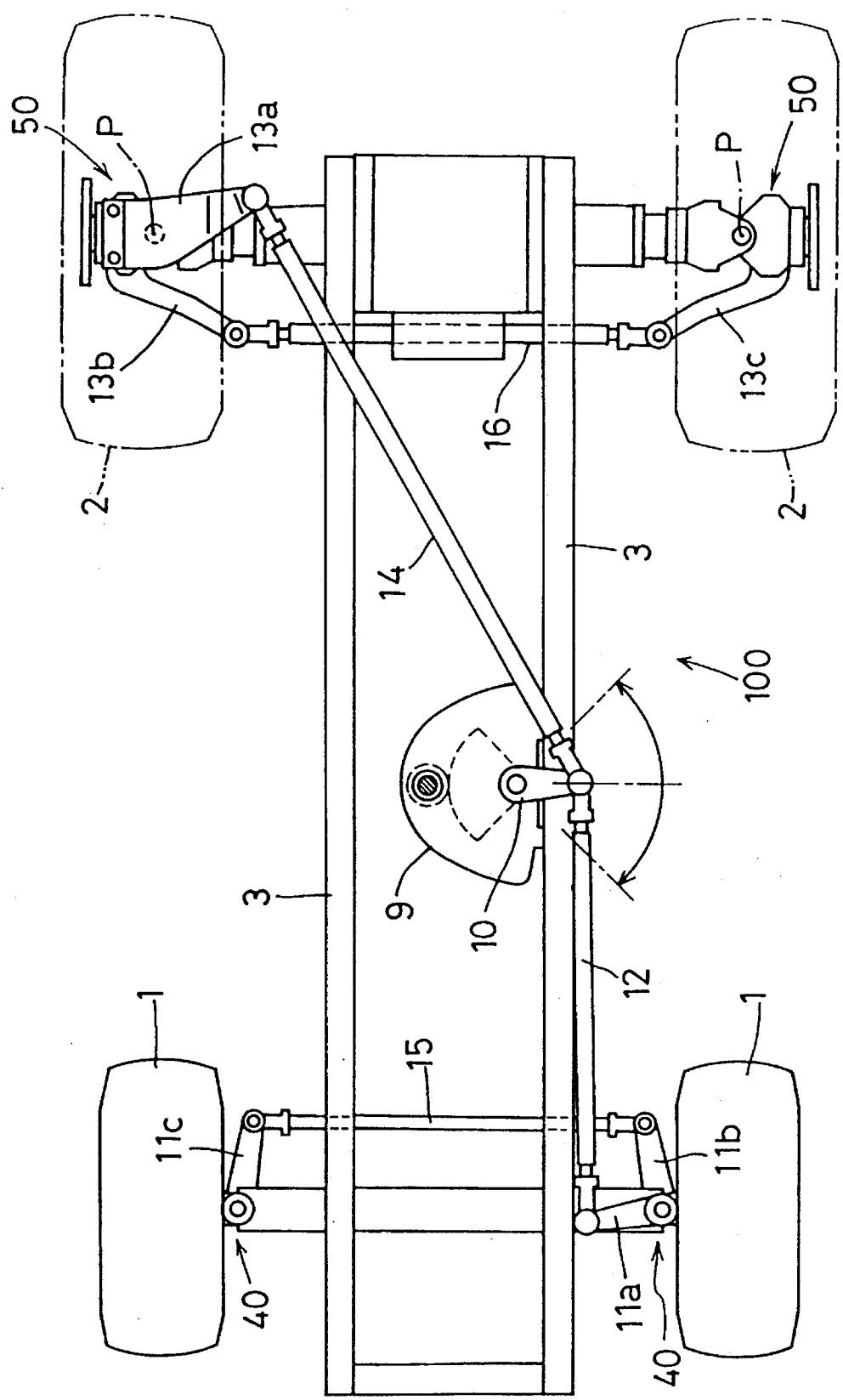
FIG. 2 is a schematic plan view of the four-wheel steering device.

As shown in FIG. 2, the body frame 3 supports a steering gearbox 9 mounted on a left side thereof. A pitman arm 10 extends laterally outwardly over the body frame 3. A first knuckle arm 11a of the left front wheel 1 is operatively connected to the pitman arm 10 through a front wheel drag link 12 extending substantially horizontally and longitudinally of the body frame 3. A first knuckle arm 13a of the right rear wheel 2 is operatively connected to the pitman arm 10 through a rear wheel drag link 14 extending substantially horizontally and transversely of the body frame 3. A second knuckle arm 11b of the left front wheel 1 is disposed below the first knuckle arm 11a of the left front wheel 1. This second knuckle arm 11b is connected to a third knuckle arm 11c of the right front wheel 1 through a tie rod 15. Similarly, a second knuckle arm 13b of the right rear wheel 2 is disposed below the first knuckle arm 13a of the right rear wheel 2. This second knuckle arm 13b is connected to a third knuckle arm 13c of the left rear wheel 2 through a tie rod 16. These components constitute a four-wheel steering device 100 for steering the front and rear wheels 1 and 2 in opposite directions at the same time in response to a turning operation of the steering wheel 5. As particularly described hereinafter, each front wheel 1 and each front wheel knuckle arm are interconnected through a kingpin assembly 40, and each rear wheel 2 and each rear wheel knuckle arm are interconnected through a kingpin assembly 50.

Figure 3:
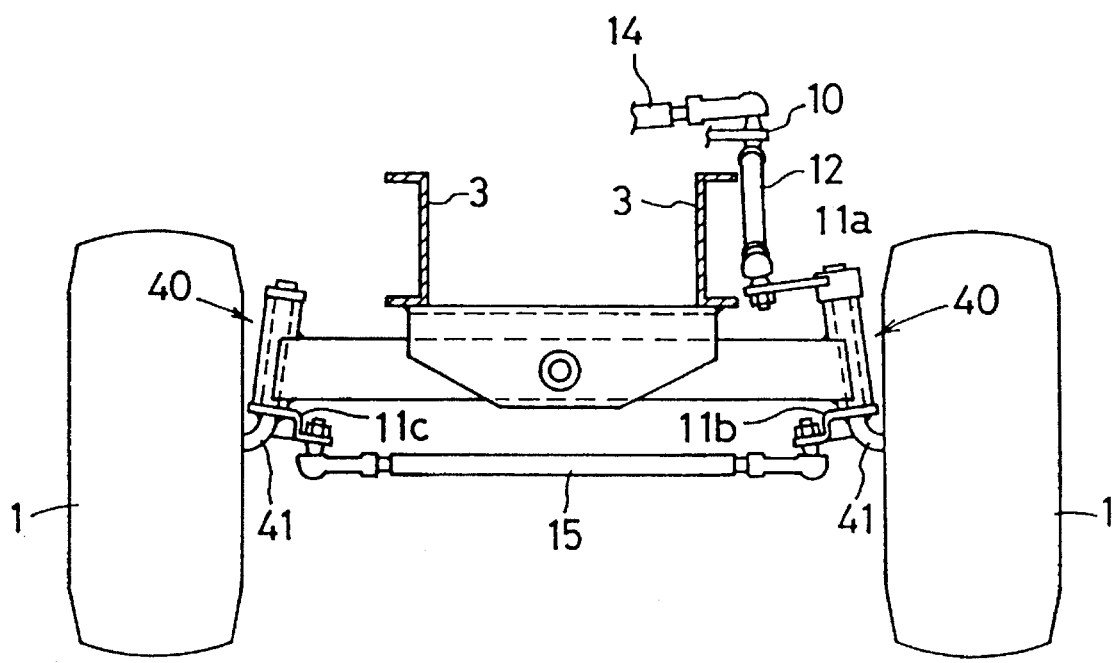
FIG. 3 is a front view in vertical section showing a front wheel region of the four-wheel steering device.

As shown in FIG. 3, the first knuckle arm 11a of the left front wheel 1 is disposed adjacent an upper surface of the body frame 3, and fixed to an upper end of a kingpin 41 of the front wheel kingpin assembly 40 supported by a front axle case. The second knuckle arm 11b of the left front wheel 1 and the third knuckle arm 11c of the fight front wheel 1 are fixed to lower positions of kingpins 41. The second knuckle arm 11b and third knuckle arm 11c are interconnected through the front wheel tie rod 15 extending substantially linearly.

Figure 4:
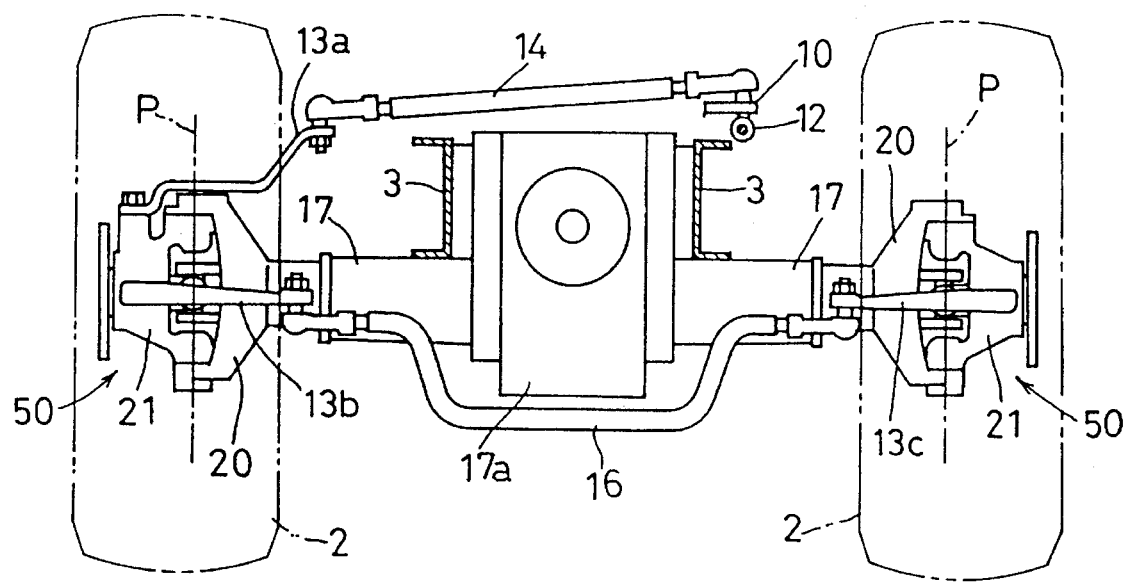
FIG. 4 is a front view in vertical section showing a rear wheel region of the four-wheel steering device.

As shown in FIG. 4, the first knuckle arm 13a of the right rear wheel 2 is disposed above the body frame 3. The first knuckle arm 11a of the front wheel 1 and the first knuckle arm 13a of the rear wheel 2 are connected to the pitman arm 10 disposed above the body frame 3, through the front wheel drag link 12 in form of a straight pipe disposed adjacent the upper surface of the body frame 3, and the rear wheel drag link 14 in form of a straight pipe above the body frame 3, respectively.

Figure 5:
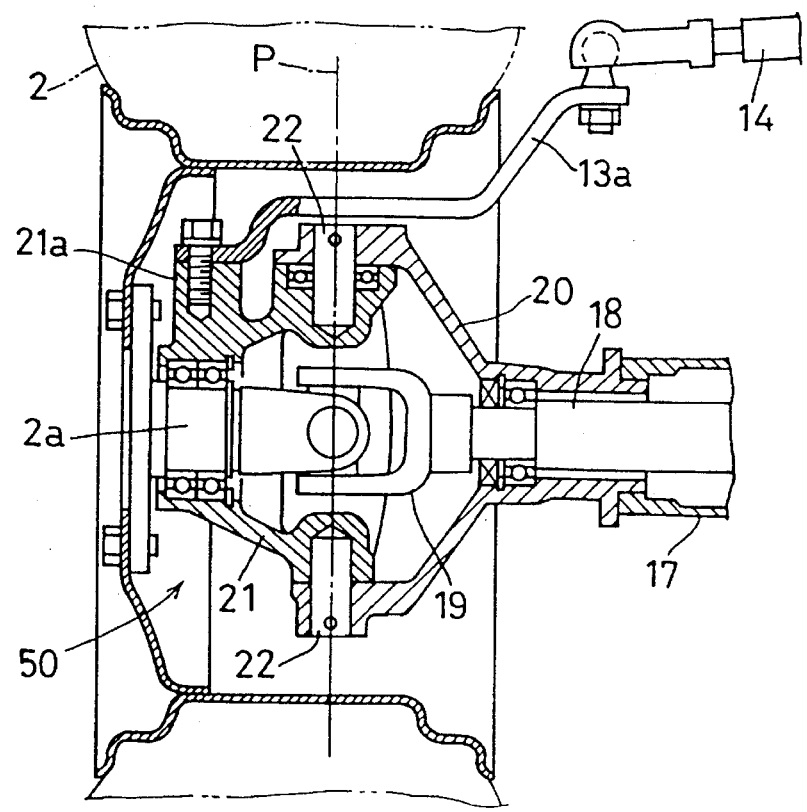
FIG. 5 is a front view in vertical section showing a kingpin assembly for a right rear wheel.

As shown in FIG. 5, a rear axle case 17 contains a drive shaft 18, and each rear wheel 2 has an axle 2a connected to the drive shaft 18 through a universal joint 19. The rear wheel kingpin assembly 50 includes an inner support 20 fixed to the rear axle case 17, an outer support 21, and a kingpin 22 divided into two, upper and lower, parts rotatable about a vertical axis P and interconnecting the inner support 20 and outer support 21. The first rear wheel knuckle arm 13a is bolted to a flange surface 21a formed at an upper end of the outer support 21. Thus, the first rear wheel knuckle arm 13a extends above the upper kingpin part and inner support 20. The first rear wheel knuckle arm 13a includes an upwardly bent step portion to compensate for a level difference between the pitman arm 10 and the flange surface 21a at the upper end of the outer support 21. In this embodiment, the first knuckle arm 13a connected to the rear wheel drag link 14 and the second knuckle arm 13b connected to the tie rod 16 are formed separately from each other. The second knuckle arm 13b is formed integral with the outer support 21.

As seen from FIG. 4, a rear wheel tie rod device includes the second knuckle arm 13b fixed to the outer support 21 for the fight rear wheel 2, the third knuckle arm 13c fixed to the outer support 21 for the left rear wheel 2, and the rear wheel tie rod 16 interconnecting the second and third knuckle arms 13b and 13c. The first and second knuckle arms 13a and 13b are fixed to the outer support 21 substantially in level with the axle. The tie rod 16 extends under and around a differential case 17a in an intermediate position of the axle case 17.

What is claimed is:

1. A four-wheel steering vehicle comprising:

an elongate body frame;

a steering wheel;

front wheels steerable by said steering wheel;

rear wheels steerable by said steering wheel; and connecting means for operatively connecting said steering wheel to said front wheels and said rear wheels to transmit movement of said steering wheel to said front wheels and said rear wheels, said connecting means including:

a pitman arm overhanging outwardly and laterally of said body frame to be pivotable with turning of said steering wheel;

a first front wheel knuckle arm operatively connected to one of said front wheels;

a first rear wheel knuckle arm operatively connected to one of said rear wheels disposed at the same side as the other front wheel;

a front wheel drag link disposed laterally outwardly of said body frame and extending longitudinally of said body frame, said front wheel drag link connecting said pitman arm and said first front wheel knuckle arm;

a rear wheel drag link extending substantially horizontally over and across said body frame, said rear wheel drag link interconnecting said pitman arm and said first rear wheel knuckle arm;

front wheel tie rod means for interconnecting said front wheels; and rear wheel tie rod means for interconnecting said rear wheels.

2. A four-wheel steering vehicle as defined in claim 1, wherein said one of said front wheels and said first front wheel knuckle arm are operatively interconnected through a front wheel kingpin assembly, and said one of said rear wheels and said first rear wheel knuckle arm are operatively interconnected through a rear wheel kingpin assembly.

3. A four-wheel vehicle comprising:

an elongate body frame;

a steering wheel;

front wheels steerable by said steering wheel;

rear wheels steerable by said steering wheel; and connecting means for operatively connecting said steering wheel to said front wheels and said rear wheels to transmit movement of said steering wheel to said front wheels and said rear wheels, said connecting means including:

a pitman arm overhanging laterally of said body frame to be pivotable with turning of said steering wheel;

a first front wheel knuckle arm operatively connected to one of said front wheels through a front wheel kingpin assembly;

a first rear wheel knuckle arm operatively connected to one of said rear wheels disposed at the same side as the other front wheel through a rear wheel kingpin assembly having an inner support fixed to a rear axle case, an outer support, and a kingpin rotatable about a vertical axis and interconnecting said inner support and said outer support, said first rear wheel knuckle arm being fixed to an upper end region of said outer support;

a front wheel drag link disposed laterally outwardly of said body frame and extending longitudinally of said body frame, said front wheel drag link interconnecting said pitman arm and said first front wheel knuckle arm;

a rear wheel drag link extending substantially horizontally over and across said body frame, said rear wheel drag link interconnecting said pitman arm and said first rear wheel knuckle arm;

front wheel tie rod means for interconnecting said front wheels; and rear wheel tie rod means for interconnecting said rear wheels.

4. A four-wheel steering vehicle as defined in claim 3, wherein said first rear wheel knuckle arm includes an upwardly bent step portion to compensate for a level difference between said pitman arm and said upper end region of said outer support.

5. A four-wheel steering vehicle as defined in claim 4, wherein said first rear wheel knuckle arm extends above said kingpin and said inner support.

6. A four-wheel steering vehicle as defined in claim 3, wherein said rear wheel tie rod means includes a second knuckle arm fixed to said outer support, a third knuckle arm fixed to an outer support for the other rear wheel, and a rear wheel tie rod interconnecting said second and third knuckle arms, said second and third knuckle arms being fixed to said outer supports substantially in level with axles.

\* \* \* \* \*